US009926883B1

(12) United States Patent
Ress

(10) Patent No.: US 9,926,883 B1
(45) Date of Patent: Mar. 27, 2018

(54) GAS TURBINE ENGINE WITH AXIAL FLOW FAN WITH TWIN STREAM IMPELLER AND VARIABLE AREA BYPASS NOZZLE

(71) Applicant: Florida Turbine Technologies, Inc., Jupiter, FL (US)

(72) Inventor: Robert A. Ress, Carmel, IN (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/597,216

(22) Filed: May 17, 2017

Related U.S. Application Data

(60) Provisional application No. 62/457,889, filed on Feb. 11, 2017.

(51) Int. Cl.
| | | |
|---|---|---|
| *F02K 1/08* | (2006.01) |
| *F01D 17/10* | (2006.01) |
| *F02K 3/06* | (2006.01) |
| *F01D 17/14* | (2006.01) |
| *F02C 3/04* | (2006.01) |
| *F02K 3/02* | (2006.01) |
| *F02K 3/075* | (2006.01) |

(52) U.S. Cl.
CPC ............. *F02K 1/08* (2013.01); *F01D 17/105* (2013.01); *F01D 17/141* (2013.01); *F02K 3/06* (2013.01); *F02C 3/04* (2013.01); *F02K 3/02* (2013.01); *F02K 3/075* (2013.01); *F05D 2220/323* (2013.01)

(58) Field of Classification Search
CPC ... F02K 3/02; F02K 3/06; F02K 3/075; F02K 3/077; F02K 1/08; F01D 17/105; F01D 17/141; F01D 1/18; F01D 1/22; F01D 5/03; F01D 5/043
See application file for complete search history.

(56) References Cited

U.S. PATENT DOCUMENTS

| | | | | |
|---|---|---|---|---|
| 3,768,933 A | * | 10/1973 | Bouiller ................. | F01D 5/022 415/77 |
| 3,897,001 A | * | 7/1975 | Helmintoller, Jr. ....... | F02K 1/08 239/265.13 |
| 3,937,013 A | * | 2/1976 | Aspinwall ............... | F02K 3/068 415/145 |
| 3,953,147 A | * | 4/1976 | Aspinwall ............... | F04D 25/16 415/143 |
| 4,043,121 A | * | 8/1977 | Thomas ................. | F02K 3/075 415/78 |

(Continued)

OTHER PUBLICATIONS

Rauch, D., "Design Study of an Air Pump and Integral Lift Engine ALF-504 Using the Lycoming 502 Core", NASA Report CR-120992, NASA Lewis Research Center, Cleveland, Ohio, 1972, pp. 1-182.*

*Primary Examiner* — Lorne Meade

(74) *Attorney, Agent, or Firm* — John Ryznic

(57) ABSTRACT

A gas turbine engine for a small aircraft such as a UAV having a bypass flow with a variable area bypass nozzle located at an outlet of the bypass channel, the nozzle having one position with a maximum flow area and a second position with a minimal flow area. The compressor is a twin stream compressor with an inner flow path for compressed air to the combustor and an outer flow path for the bypass channel. A fan stage can be used in front of the compressor.

3 Claims, 2 Drawing Sheets

(56) References Cited

U.S. PATENT DOCUMENTS

| | | | | |
|---|---|---|---|---|
| 4,069,661 A * | 1/1978 | Rundell | ............... | F02K 3/075 60/204 |
| 4,072,008 A * | 2/1978 | Kenworth | ............... | F02K 3/075 60/262 |
| 4,285,194 A * | 8/1981 | Nash | ............... | F02K 1/822 60/262 |
| 5,105,616 A * | 4/1992 | Bornemisza | ............... | F02C 3/05 60/726 |
| 5,806,303 A * | 9/1998 | Johnson | ............... | F02K 1/30 60/226.1 |
| 5,867,980 A * | 2/1999 | Bartos | ............... | F02K 7/16 60/226.1 |
| 6,901,739 B2 * | 6/2005 | Christopherson | ............... | F01D 17/105 60/226.3 |
| 7,055,306 B2 * | 6/2006 | Jones | ............... | F01D 5/022 415/144 |
| 8,615,980 B2 * | 12/2013 | Agrawal | ............... | F02C 6/206 244/17.11 |

* cited by examiner

GAS TURBINE ENGINE WITH AXIAL FLOW FAN WITH TWIN STREAM IMPELLER AND VARIABLE AREA BYPASS NOZZLE

CROSS-REFERENCE TO RELATED APPLICATIONS

This application claims the benefit to U.S. Provisional Application 62/457,889 filed on Feb. 11, 2017 and entitled GAS TURBINE ENGINE WITH AXIAL FLOW FAN WITH TWIN STREAM IMPELLER AND VARIABLE AREA BYPASS NOZZLE.

GOVERNMENT LICENSE RIGHTS

None.

BACKGROUND OF THE INVENTION

Field of the Invention

The present invention relates generally to a gas turbine engine, and more specifically to a small gas turbine engine with a twin stream impeller and a variable area bypass nozzle.

Description of the Related Art Including Information Disclosed Under 37 CFR 1.97 and 1.98

A turbofan gas turbine engine employs a fan section 11 ahead of a compressor section 12 where a portion of the fan discharge flow 13 is bypassed around the core of the engine. The fan is driven by a low pressure turbine 14 in a dual spool turbofan arrangement and by the primary turbine in a single spool arrangement. In the single spool arrangement shown in FIG. 1, an operability control feature is required to maintain stable operation of the fan during off-design conditions.

BRIEF SUMMARY OF THE INVENTION

A small gas turbine engine with a single spool and a fan in which one embodiment includes a variable area bypass nozzle.

A second embodiment is a small gas turbine engine with a single spool and a fan and a twin stream impeller that includes a guide vane between the fan and the twin stream impeller.

DETAILED DESCRIPTION OF THE INVENTION

Figure 1:
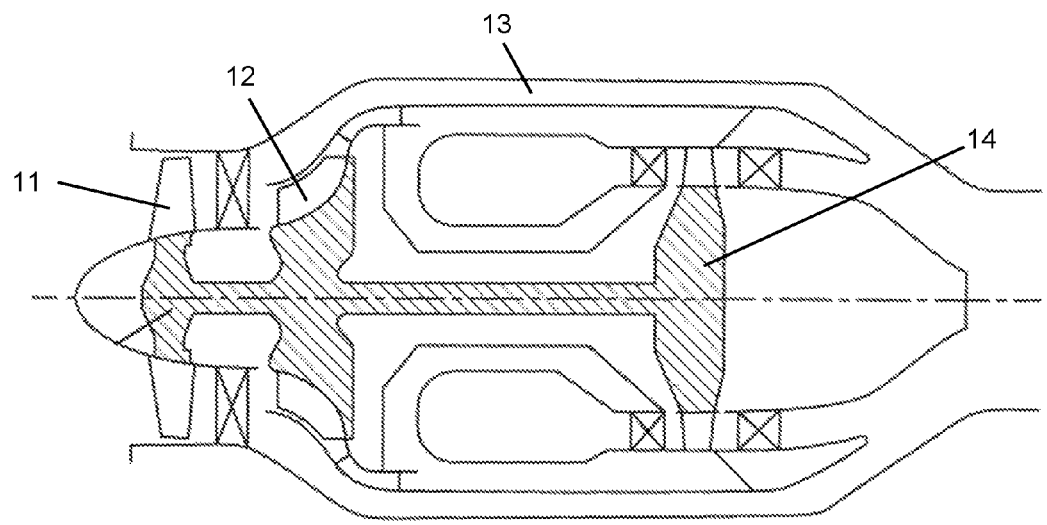
FIG. 1 shows a single spool gas turbine engine with a fan of the prior art.
Figure 2:
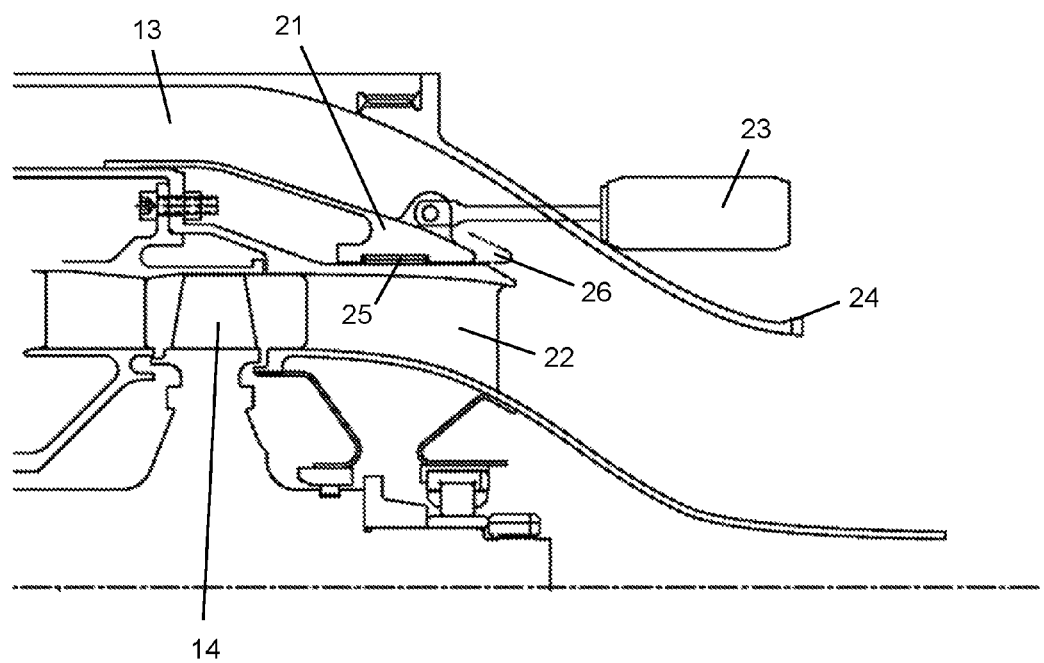
FIG. 2 shows single spool gas turbine engine with a fan with a variable area bypass nozzle of the present invention.

The present invention is a small gas turbine engine with a single spool and a fan for use in a small engine such as that used to power a UAV (Unmanned Aero Vehicle). A variable area bypass nozzle is shown in FIG. 2 and includes a sliding valve 21 mounted on a turbine exhaust case 22 where the valve is positioned with an actuator 23 mounted on the exhaust nozzle 24. The actuator may be hydraulic and can use fuel as the actuator hydraulic liquid. As an option, the valve may be positioned with links back to a remote mounted electric actuator. The exhaust nozzle is spring loaded against the turbine exhaust case with a wave spring 25.

The variable area bypass nozzle is intended to be utilized as a two-position nozzle where the nozzle is set to a minimum discharge area for design point operation and to a maximum discharge area for off-design operation where the fan may be overly back pressured. Other scenarios are envisioned where the variable area bypass nozzle is controlled to a schedule that considers rotor speed and compressor discharge pressure. FIG. 2 shows the engine with the sliding valve in a fully open position. A partial phantom section 26 shows the minimum area position of the sliding valve. The sliding valve 21 controls the flow area of the bypass channel 13.

Figure 3:
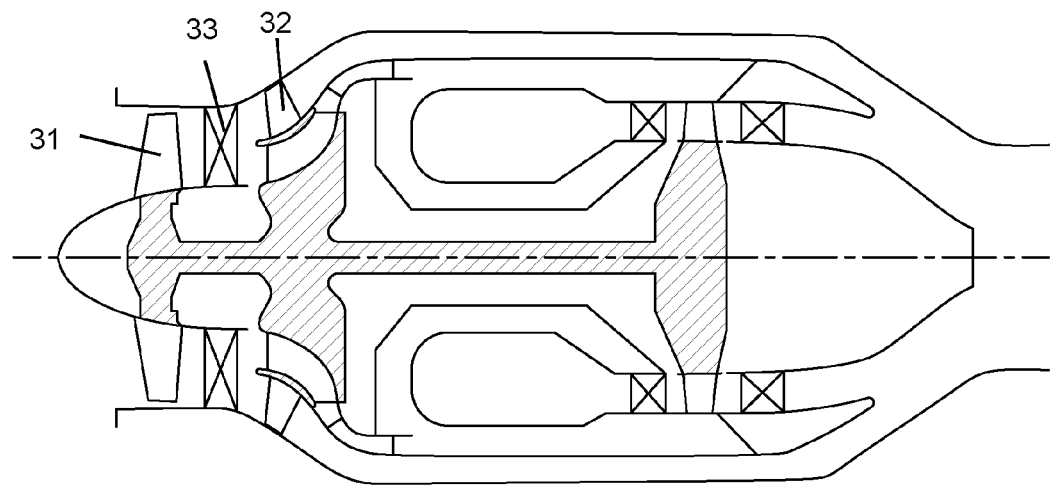
FIG. 3 shows a single spool gas turbine engine with a fan and a twin stream impeller of the present invention.

FIG. 3 shows a single shaft turbofan engine with an axial flow fan 31 and a downstream twin stream impeller 32. A static fan exit guide vane row 33 is positioned downstream of the rotating fan stage 31. While FIG. 3 shows a single spool turbofan, a dual spool turbofan is also envisioned where the fan stage 31 is driven by a dedicated low pressure turbine (not shown) located downstream in the hot gas flow path from the high pressure turbine.

The fan stage of the fan 31 and twin stream impeller 32 arrangement has a design pressure ratio of 1.6 to 2.2 while the twin stream impeller 32 tip airfoil has a design pressure ratio of 1.15 to 1.6. In the axial flow fan 31 and twin stream impeller 32 configuration of FIG. 3, the twin stream impeller tip airfoil design pressure ratio is lower than the twin stream only configuration of FIG. 4. This reduces the structural loads on the twin stream impeller and results in a lighter assembly.

Figure 4:
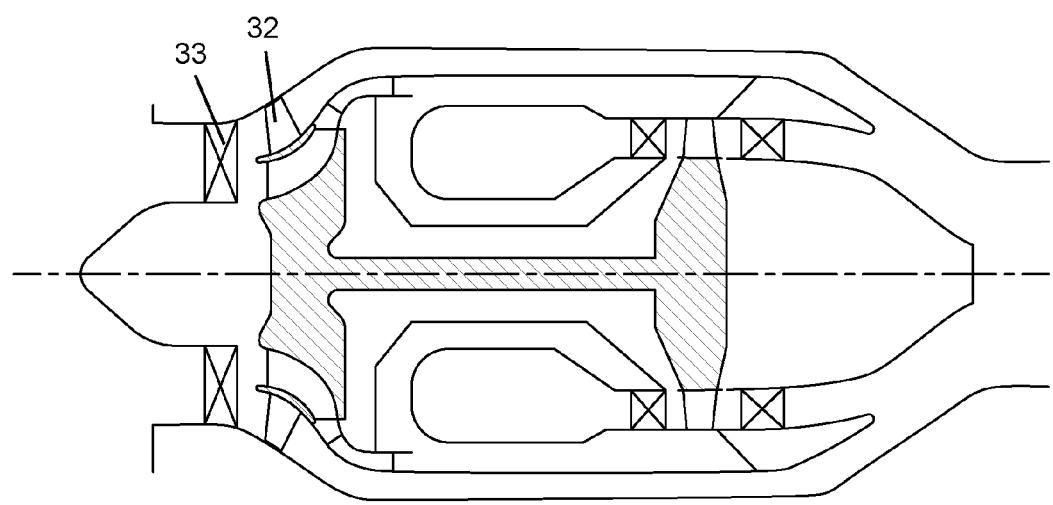
FIG. 4 shows a single spool gas turbine engine a twin stream impeller that also operates as a fan of the present invention.

A turbofan engine with a twin stream impeller 32 is shown in FIG. 4 and is limited in the amount of pressure ratio developed in the core stream. No fan stage is used in the FIG. 4 embodiment. The bypass flow around the engine core is produced by the outer blade of the twin stream impeller 32 and thus functions as the fan for the bypass air flow. The inner blade produces compressed air that is delivered to the combustor of the engine. This also limits the amount of thrust developed by the engine stage to supercharge the core. As the fan stage 32 also supercharges the fan stream to maintain an equivalent overall bypass pressure ratio.

I claim the following:

1. A single spool gas turbine engine comprising:
    a twin stream centrifugal compressor with an inner core flow path and an outer bypass flow path, the outer bypass flow path of the twin stream centrifugal compressor includes a row of fan blades to compress a bypass flow through a bypass flow channel;
    a combustor to receive compressed air from the inner flow path of the twin stream centrifugal compressor;
    a turbine driving the twin stream centrifugal compressor;
    an outlet at an end of the bypass flow channel; and,
    a two-position variable area bypass nozzle at the outlet of the bypass flow channel to change a flow area of the outlet of the bypass flow channel of the single spool gas turbine engine, the two-position variable area bypass nozzle is a sliding valve connected to an actuator for movement to a minimal flow area position and a spring for movement to a fully open position.

2. The gas turbine engine of claim 1, and further comprising:

the single spool gas turbine engine includes a fan stage connected to the twin stream centrifugal compressor upstream from the twin stream centrifugal compressor.

3. The gas turbine engine of claim 1, and further comprising:

the actuator for the sliding valve is a hydraulic actuator with a fuel used for the gas turbine engine as the hydraulic fluid for the hydraulic actuator.

\* \* \* \* \*